(12) United States Patent  (10) Patent No.: US 7,784,879 B2
Koelzer  (45) Date of Patent: Aug. 31, 2010

(54) ELECTRONIC CONTROL AIR MANAGEMENT WITH PARKING BRAKE AND TRAILER SUPPLY CONTROL

(75) Inventor: Robert L. Koelzer, Kearney, MO (US)

(73) Assignee: Haldex Brake Corporation, Kansas City, MO (US)

(*) Notice: Subject to any disclaimer, the term of this patent is extended or adjusted under 35 U.S.C. 154(b) by 815 days.

(21) Appl. No.: 10/195,983

(22) Filed: Jul. 16, 2002

(65) Prior Publication Data

US 2004/0012249 A1 Jan. 22, 2004

(51) Int. Cl.
*B60T 13/74* (2006.01)
(52) U.S. Cl. .................. 303/3; 303/7; 303/20
(58) Field of Classification Search ............ 303/3, 303/6.01, 7, 15, 9.76, 20
See application file for complete search history.

(56) References Cited

U.S. PATENT DOCUMENTS

| | | | | |
|---|---|---|---|---|
| 3,785,393 A | | 1/1974 | Tanguy ................ 137/110 |
| 3,786,828 A | | 1/1974 | Krechel ............... 137/116 |
| 4,054,327 A | | 10/1977 | Rebenstorf ........... 303/84 R |
| 4,476,889 A | | 10/1984 | Haynes ............... 137/116.3 |
| 4,550,953 A | * | 11/1985 | Bartholomew ......... 303/15 |
| 4,733,696 A | | 3/1988 | Baun .................. 137/883 |
| 4,763,959 A | * | 8/1988 | Vandemotter ........... 303/9 |
| 4,936,026 A | | 6/1990 | Cramer et al. .......... 34/53 |
| 4,942,571 A | * | 7/1990 | Moller et al. ......... 370/407 |
| 5,061,015 A | * | 10/1991 | Cramer et al. ........... 303/7 |
| 5,118,165 A | * | 6/1992 | Latvala .............. 303/9.76 |
| 5,508,689 A | * | 4/1996 | Rado et al. ........... 340/3.1 |
| 5,566,717 A | | 10/1996 | Robert ............... 137/883 |
| 5,678,900 A | | 10/1997 | Blanz ................ 303/6.01 |
| 5,917,139 A | | 6/1999 | Goodell et al. ........ 96/113 |
| 6,041,808 A | | 3/2000 | Blanz ............... 137/118.06 |
| 6,111,888 A | * | 8/2000 | Green et al. .......... 370/461 |
| 6,289,911 B1 | * | 9/2001 | Majkovic .............. 137/1 |
| 6,322,159 B1 | * | 11/2001 | Eberling ............... 303/7 |
| 6,540,308 B1 | * | 4/2003 | Hilberer ............. 303/6.01 |

FOREIGN PATENT DOCUMENTS

| | | |
|---|---|---|
| DE | 44 22 575 | 6/1994 |
| DE | 196 49 498 | 11/1996 |
| DE | 198 35 638 | * 2/2000 |

* cited by examiner

*Primary Examiner*—Bradley T King
(74) *Attorney, Agent, or Firm*—St. Onge Steward Johnston & Reens LLC

(57) ABSTRACT

A brake system assembly for a motor vehicle is provided comprising an air compressor operably engaged to the motor vehicle engine; a compressed air control device; at least one supply circuit for retaining compressed air in fluid communication with the compressed air control device; a service brake operably engaged by the application of compressed air; a parking brake operably disengaged by the application of compressed air; a dash control assembly having a parking brake control; a plurality of functional conduits for fluid communication; and a plurality of valves for manipulating compressed air including a foot brake valve for selectively engaging the brake system.

10 Claims, 5 Drawing Sheets

ELECTRONIC CONTROL AIR MANAGEMENT WITH PARKING BRAKE AND TRAILER SUPPLY CONTROL

FIELD OF THE INVENTION

The present invention relates to a pneumatic brake system as commonly employed in heavy commercial motor vehicles and in combination with towed semi-trailers. More particularly, the invention relates to a brake system assembly that includes a compressed air control device with parking brake and trailer supply controls for controlling the supply of compressed air on heavy motor vehicles and in combination with towed semi-trailers, a method of assembly for same, and a method of operating same.

BACKGROUND OF THE INVENTION

Typically, heavy commercial motor vehicles, such as trucks, tractor-trailer combinations, buses, and other vehicles use a pneumatic brake system where brakes are actuated by compressed air generated from ambient air by a compressor engaged with the vehicle engine. When braking is needed in a moving vehicle, the compressed air is fed through conduits and controls to the brake actuation chambers of service brakes. This typically engages a diaphragm or piston that acts on a brake shoe and drum assembly, where braking torque is applied.

To keep a still vehicle from moving or to control an errant vehicle, spring brakes are employed as emergency/parking brakes. In these, an actuator includes a strong compression spring which applies the brake when air is released from the actuation chamber. Normally, spring brakes are pressurized with air during movement of the vehicle. One wall of the chamber, typically a diaphragm or piston, is movable and compresses the spring. Barring the application of fail-safe redundancy to prevent unintended catastrophic brake engagement, the loss of air pressure to the spring brake causes the brake to become mechanically engaged.

The brake systems of towed vehicles, such as trailers, are connected to the towing vehicle to receive compressed air from that vehicle so that the service brakes are applied in unison with those in the towing vehicle. Spring brakes are similarly fed from the towing vehicle and responsive to operator action.

Those skilled in the art will recognize the terms "service brake" and "service brakes" designate the brakes used under normal driving conditions by the application of compressed air and the terms are used in this and more expansive meanings herein. Similarly, those skilled in the art use the terms "spring brake" and "spring brakes" to designate the aforementioned types of emergency/parking brakes and the terms are used in this and more expansive meanings herein.

Innovation in brake system design for heavy commercial motor vehicles is constrained by a significant body of governmental regulations such as Federal Motor Vehicle Safety Standard FMVSS-121 (49 C.F.R. 571 et al.) and its Canadian counterpart CMVSS-121. The plethora of regulations require systems to be designed with fail-safe redundancies, minimum sizes for tanks serving as reservoirs of compressed air, features that prevent overpressurization of brake actuators, and fail-safe connections. Consequently, innovation comes in incremental steps to match newly issued regulations or minor mechanical improvements.

Therein, the typical advances have been to resort to an ever increasingly complex, costly, and difficult to install arrangement of air reservoirs, multiple pressure valves, pneumatic controls, and conduits providing selective application of compressed air while still maintaining the system in regulatory compliance.

FIG. 2 illustrates a typically complex conventional design for a tractor-trailer combination and the problems associated with such known designs. The advantageous embodiments of the present invention will be best understood in contrast with such a known more cumbersome design.

In the truck, interchangeably called the tractor, air compressor 1 is operated by the engine of the vehicle. When the compressor is loaded, e.g. engaged, it passes compressed air to air dryer 2 where moisture entrained air is removed by passing it over a desiccant bed. The dried compressed air is fed to supply reservoir 3c which in turn feeds it to primary reservoir 3a and secondary reservoir 3b. To protect reservoir 3a from overpressurization, safety valve 4 is provided and to protect reservoirs 3a and 3b from the loss of air pressure, check valves, e.g. one way valves, 5a and 5b are provided, respectively. Further, analog instrumentation 6 is provided for measuring reservoir 3c, and instrumentation 7a and 7b, usually affixed to the cabin dash, are provided to gauge air pressure in reservoirs 3a and 3b. When reservoirs 3a and 3b are pressurized to a predetermined level, pneumatic pressure causes electro-mechanical governor 8 to unload, e.g. disengage, compressor 1 to prevent uncontrolled pressure build-up in the system.

Foot brake valve 11 typically is a dual circuit type valve responsive to a treadle and plunger or pedal and plunger operated by the driver. During normal operation, when foot brake valve 11 is actuated, air is fed from reservoir 3b to the actuating chambers of the truck service brakes 12a and 12b via a plurality of valves and conduits. Simultaneously, compressed air is also fed to truck service brakes 13a and 13b of another axle via relay valve 14. There, service brakes 13a and 13b typically are disposed as combination brakes that also include parking brakes 15a and 15b. The actuating chambers of the truck service brakes convert air pressure to braking torque.

In the event that a failure in primary reservoir 3a or the supply lines from reservoir 3a occurs, the mechanical action of depressing foot brake valve 11 causes internal valves to feed compressed air from secondary supply reservoir 3b to the system instead from primary supply reservoir 3a.

Pertinent to Federal safety regulations, the actuating chambers of truck parking brakes 15a and 15b typically include spring elements that engage the brake by forcing the braking pads in a friction bearing position. Thus, the circuit feeding the spring brakes is pressurized during vehicle movement. To disengage the brake during movement compressed air has to continuously exceed the spring forces in the brake. Typically, compressed air is fed by a circuitous route that includes sufficient redundancy to prevent unintended brake application through valves and conduits to brakes 15a and 15b.

Multiple valve system such as this known system, typically include a plurality of valve types. Pressure protection valves maintain pressure in the air supply line between the steering and at least one steerable axle in the event of failure of a pressurized air reservoir of the vehicle. Such a function prevents automatic application of the spring brakes that are activated once the pressure in the air supply line drops below a certain reference pressure. Pressure protection valves are sometimes disposed in combination with check valves. Single check valves allow compressed air to flow in only one direction and are usually of the ball or disk valve type. Double check valves feed compressed air to one component from two sources of pressurized air. In this manner, both sources of pressurized air are able to control the recipient component.

For the operator-driver to place the spring brakes in a state to permit vehicle movement, air must be fed from primary reservoir 3a and secondary reservoir 3b to cabin dash manifold 16. As shown in FIG. 3, manifold 16 includes mechanical controls 30 and 31 and a plurality of entrance and exhaust ports 32 where a plurality of conduits 33 connect to the manifold requiring the conduit lines to be plumbed into the confined cabin space. Typically, control 30 is pulled to apply the parking brake, and conversely it is pushed to disengage the parking brake permitting compressed air to be fed into the actuating chambers of brakes 15a and 15b.

To place the trailer braking system in operation the system must be charged with compressed air by operating control 32, shown in FIG. 3 as a push-pull switch, and combining the feed from the primary supply circuit with the feed from the secondary supply circuit at a check valve. The increased pressure overcomes two-way protection valve 17 feeding compressed air to the trailer when gladhand connectors 20c and 20d of the trailer mate with gladhand connectors 20a and 20b of the tractor, respectively. Connectors 20a and 20b are connected to mating gladhand connectors 20c and 20d and connected by conduits to relay valve 21 which is operably connected to reservoir 22. The reservoir is in turn operably connected through relay valve 21 to service brakes 23a, 23b, 25a, and 25b disposed with spring brakes 24a, 24b, 26a, and 26b, respectively. Relay valve 21 supplies pressurized air to, maintains pressure in, and releases pressurized air from the service brake chambers pursuant to control signals that are received from the tractor.

Similar to the tractor's parking/emergency brake circuit, the trailer's parking/emergency brake circuit is pressurized during vehicle movement to overcome the spring biasing in the trailer spring brakes. The trailer service brakes are activated when foot brake valve 11 is applied. Thus, compressed air is fed throughout the truck system and into the trailer system and via relay valve 21 to service the actuating chambers of the trailer service brakes. Hand brake valve 19, usually disposed on the steering column of the tractor, provides independent control of the trailer spring brakes when so desired by the operator.

From the foregoing description, it can be seen that to be in regulatory compliance, controls in a typical brake systems demand complex valve installations and interconnections. It can further be seen from the description that except for the electro-mechanical action of the compressor, compressed air is entirely managed by pneumatic controls. The complex interaction of controls depended on redundancies and charged pressures is necessary for regulatory compliance.

However, each valve and conduit inherently is associated with costs relative to design, installation, service, and parts inventory during vehicle manufacture and for servicing. While pneumatic controls in vehicles are generally effective as controller per se, such controls are inefficient since the controlled fluid media must be routed through the control. Thus, a plurality of conduits must be connected to the entrance and exhaust ports of the control to supply the compressed air and then feed it to the selected target. Consequently, the inherent limitations require that installation space must be reserved for control routing to accommodate the large bending radii of conduits, retaining fixtures that connect conduit to host vehicle, rigid conduit sections in corners and at sensitive locations, and protective insulating material of conduits. In turn, the significant number of parts needed for control routing incur manufacturing costs and lead to vulnerabilities in the manufacturing supply chain of the vehicle.

Cumulatively, these and other problems make installation and service of most pneumatic controls difficult in situations that place a premium on space, operator safety and comfort, and servicing accessibility. For example, in the cabin of a heavy vehicle valve and instrumentation controls must be fit into a confined dash space and may pose potential hazards to a driver. In the known brake system illustrated, placing the system of FIG. 2 in readiness requires the operator-driver to push or pull valve control switches in a dash mounted manifold control, illustrated in FIG. 3. Numerous air conduits must be connected to the manifold dash valves to permit the mechanical switching necessary to feed compressed air throughout the brake system by conduits and past mechanically operated pressure control valves.

It is also known, pneumatic controls are not flexible to accommodate changes in the physical limitations of the host vehicle. Thus, once the control routing of a brake system has been designed by a vehicle manufacturer redesign of the control routing becomes burdensome and expensive per se. Additionally, if one design has been successful, design changes may necessitate stocks of multiple part schemes resulting in burdensome parts inventory for multiple vehicle dimensions that would need to be maintained in repair facilities.

As is known that electronic controls overcome at least some of the disadvantages of pneumatic controls, namely reduced installation space, design and installation flexibility, ease in servicing, and parts efficiency. It is also known that controller area networks (CAN) effectively network and control mechanical devices through electronic controls. However, often individual electronic controls are simply substituted for individual mechanical controls leading to a hodgepodge of substitutions.

What is desired therefore is a system that simplifies the supply controls of a pneumatic braking system, that can be easily installed in a vehicle, that creates a more comfortable cabin environment for an operator, and that is more efficient in manufacturing, maintenance, and servicing. What is also desired is an electronic control system that allows further integration into other vehicle systems now known or to be developed.

SUMMARY OF THE INVENTION

Accordingly, it is an object of the invention to provide a brake system for heavy commercial motor vehicles, especially one that is flexible in installation, cost effective, and space efficient.

Another object of the invention is to provide a full-function brake system that overcomes the drawbacks of the known system.

A further object of the invention is to provide a brake system that reduces the number of mechanical controls and utilizes electronic controls and performs all required functions of brake systems for heavy commercial motor vehicles.

Lastly, but not limited thereto, it is an object of the present invention to permit further integration of the brake system with other pneumatic vehicle systems that are now known or to be developed.

These and other objects of the invention are achieved by a provision of the present invention to selectively overlay comprehensive electronic control of the management of compressed air, i.e. the production of compressed air from the ambient air and selective pressurization of a plurality of circuits, on a pneumatic brake system while maintaining the system in regulatory compliance and simplifying and reducing the interconnections.

A brake system assembly for a motor vehicle is provided comprising an air compressor operably engaged to the motor vehicle engine; a compressed air control device; at least one supply circuit for retaining compressed air having a primary supply reservoir, and a secondary supply reservoir; and both supply reservoirs separately being in fluid communication with the compressed air control device; a service brake operably engaged by the application of compressed air; a parking brake operably disengaged by the application of compressed air; a dash control assembly having a parking brake control, and an trailer supply control; a plurality of functional conduits for fluid communication; a plurality of valves for manipulating compressed air including a foot brake valve for selectively engaging the brake system; a quick release valve in fluid communication with the service brakes, a relay valve in fluid communication with the parking brakes; a hand control valve for operably engaging the parking brakes of trailers; a two way protection valve for protecting against unintended pressure loss in the brake system; and a gladhand connector.

Most conventional brake systems for heavy duty commercial vehicles employ compressed air as the fluid medium and as such is contemplated in the embodiment described herein. However, a person of ordinary skill in the art will recognize that other media may be advantageously used in appropriate conditions. Therefore, the invention is not necessarily limited to compressed air medium but the inventive concept also includes adaptation to and/or use of other fluid media.

DETAILED DESCRIPTION OF THE DRAWINGS

Figure 1:
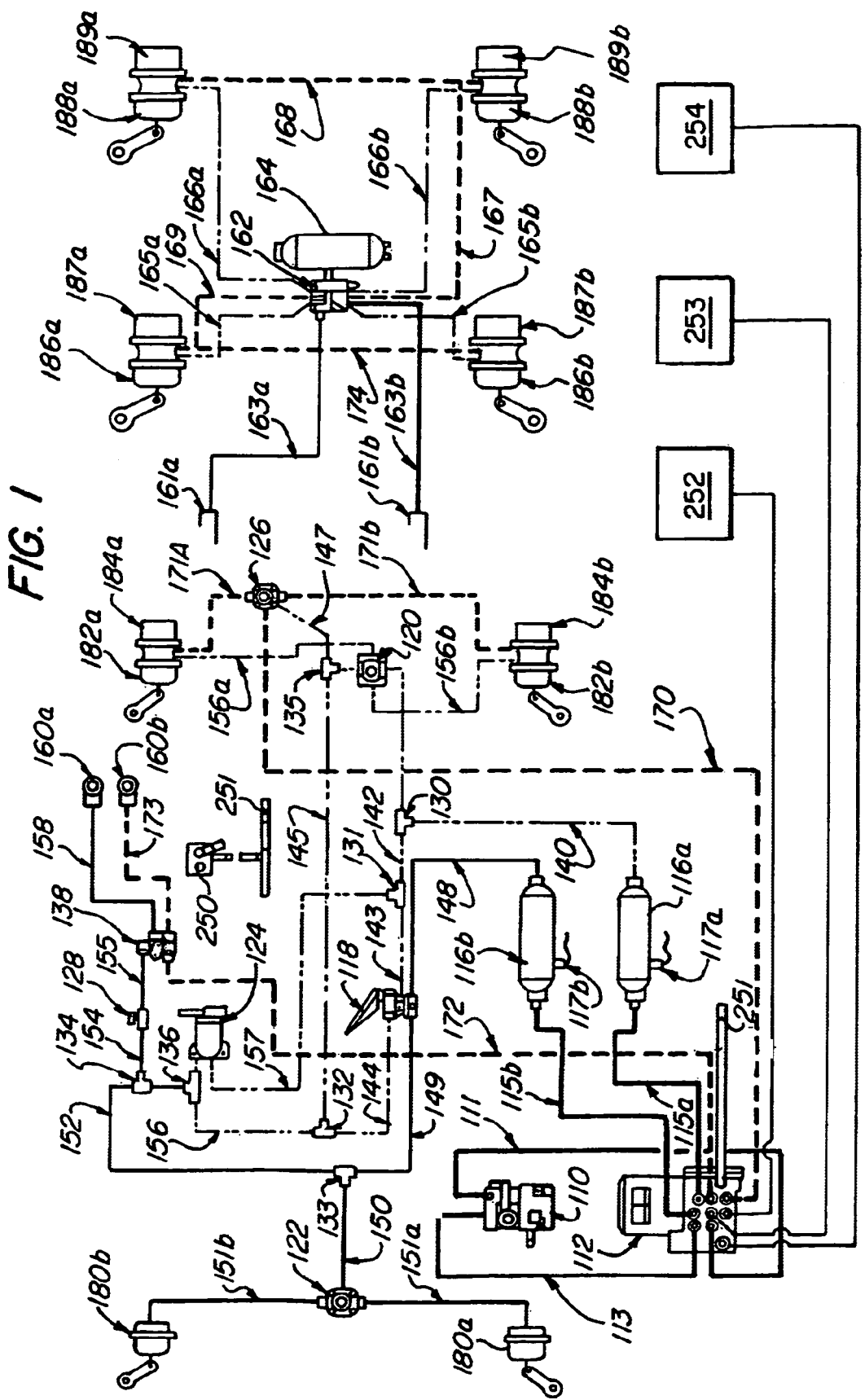
FIG. 1 illustrates in schematic format the pneumatic layout of a typical electro-mechanical brake system in accordance with one embodiment of the invention.

FIG. 1 illustrates in schematic format the simplified pneumatic layout of a brake system assembly in accordance with one embodiment of the invention. The embodiment of braking system 100 is depicted in connection with a tractor-trailer combination.

Figure 2:
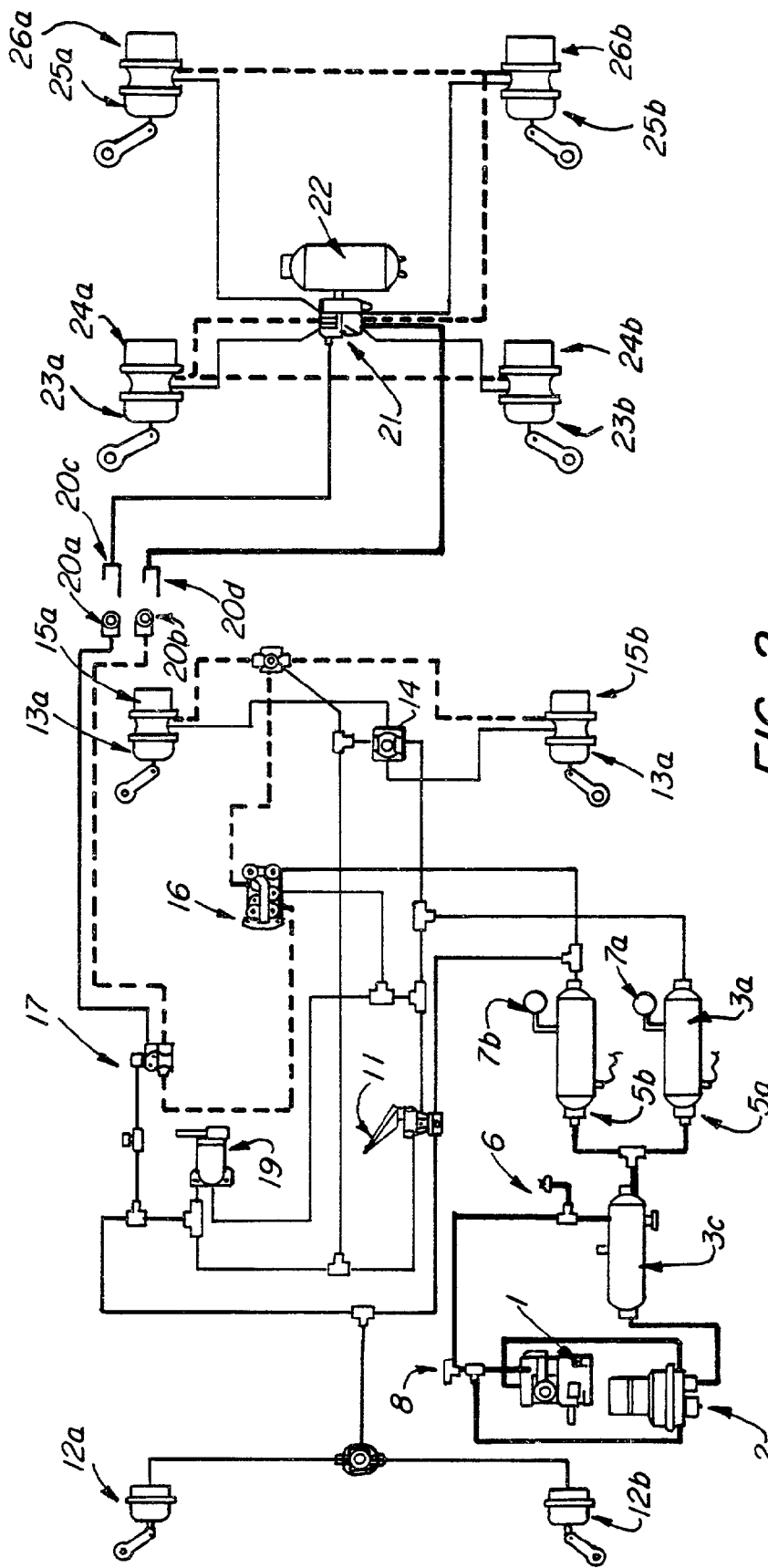
FIG. 2 illustrates in schematic format the pneumatic layout of a known electro-mechanical brake system of a tractor-trailer combination.
Figure 3:
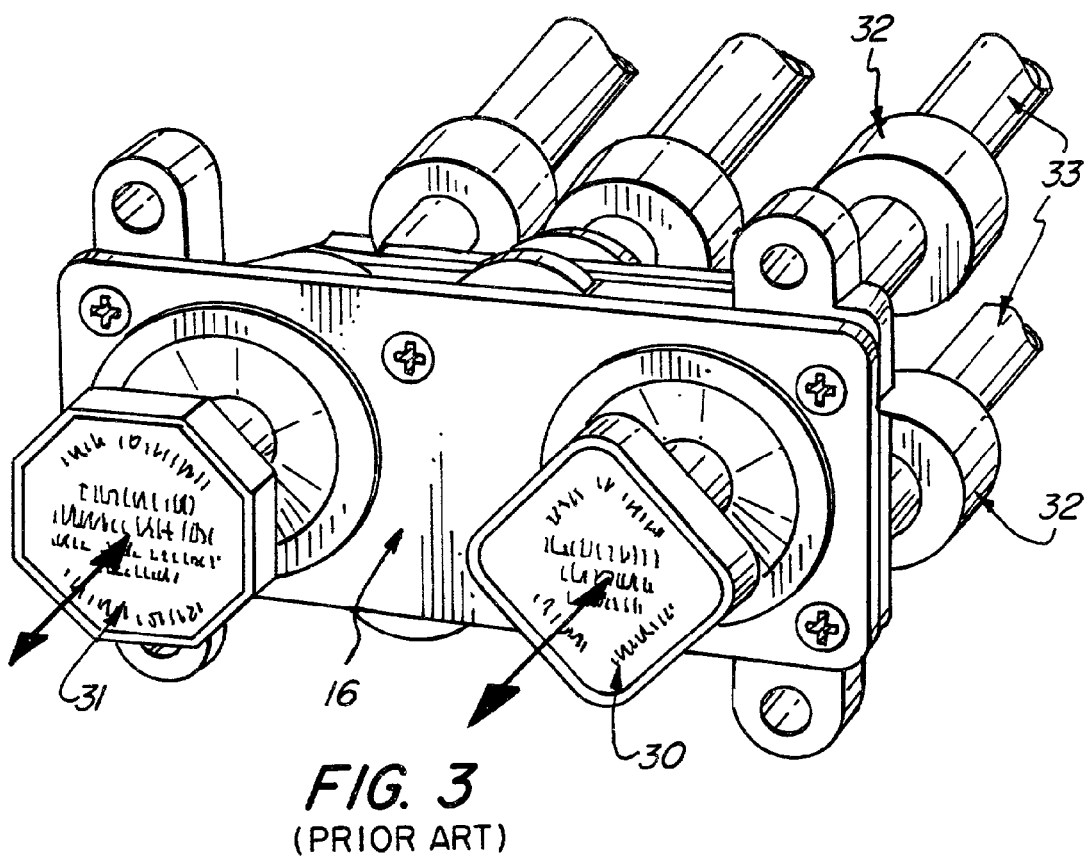
FIG. 3 is a perspective view of a known manifold and conduits.

Comparing FIGS. 1 and 2 illustrates the difference between the known system and the system in accordance with one embodiment of the present invention. An air dryer has been incorporated into compressed air control device 112. The efficiency of compressed air control device 112 allows the elimination of a reservoir 3c of FIG. 2 leaving only two reservoirs in the tractor. Analog instrumentation 7a and 7b; pressure protection valves 5a and 5b; and relief valve 6 are also replaced by compressed air control device 112. Manifold 16 is replaced with dash control assembly 250 and the circuits that were manually controlled through manifold 16 are electronically controlled by electronic control unit 210 responsive to cabling 251. The emergency/parking conduit leading from manifold 16 to double protection valve 17 and the conduit leading to the two way protection valve has been replaced by a conduit leading from compressed air control device 112 to a two way protection valve.

Figure 4:
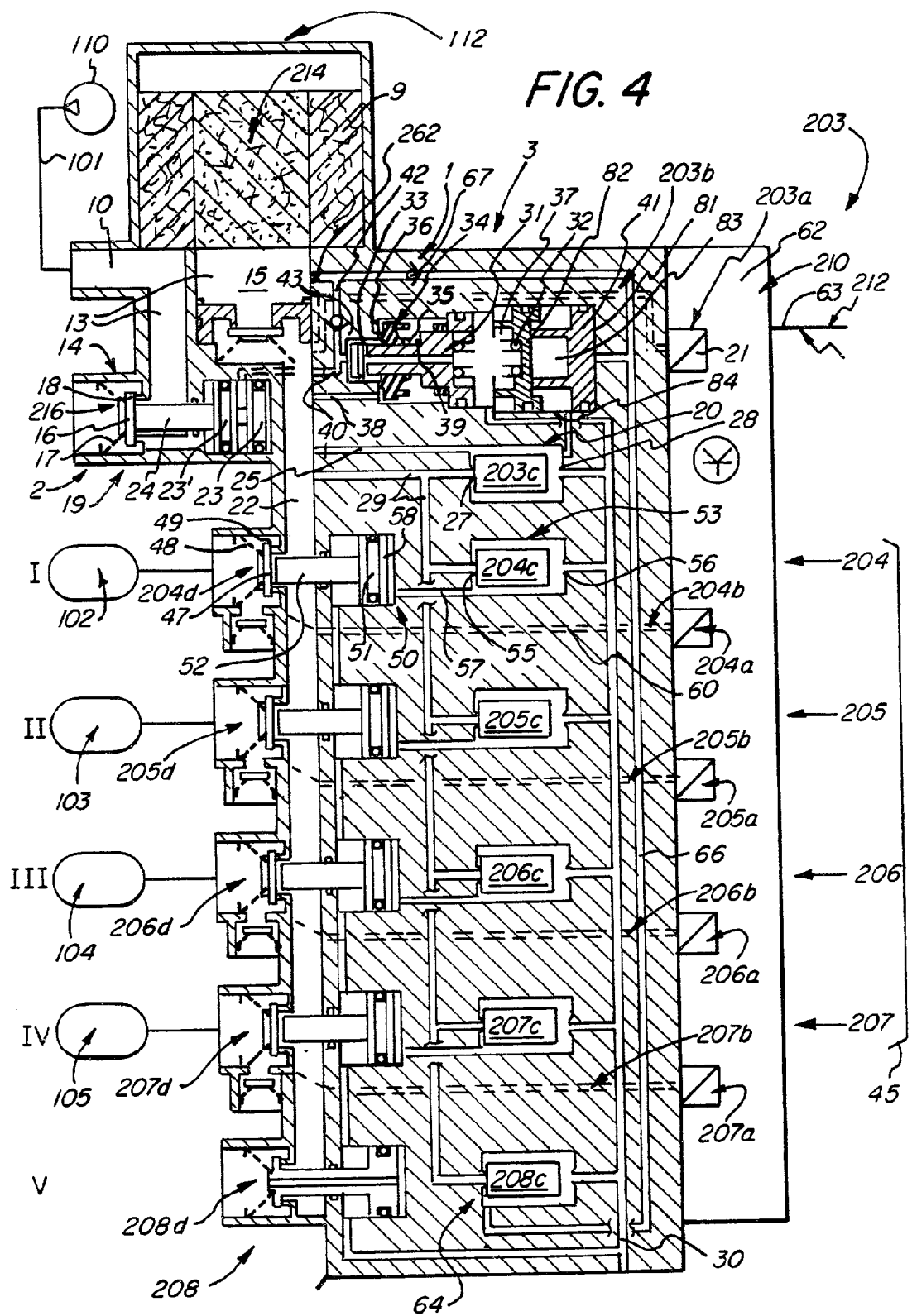
FIG. 4 is a cross-section of the compressed air control device in accordance with one embodiment of the invention.

With reference to FIGS. 1 and 4; for clarity of explanation, system 100 includes five independently operable but interrelated circuits: generation circuit 101 for charging and managing the supply of dried compressed air to the other pneumatic circuits; primary supply circuit 102 and secondary supply circuit 103 for selectively feeding compressed air to the service brakes of a tractor and trailer, tractor parking/emergency supply circuit 104 for selectively feeding compressed air to the spring brake of a tractor, trailer parking/emergency supply circuit 105 for selectively feeding compressed air to the spring brakes of a trailer, and control area network 106 for controlling the operation of braking system 100.

Circuits 101, 102, 103, 104, and 105 are pneumatic circuits that include conduits and valves for transmitting a controlled fluid media, typically compressed air within a range of 100 to 150 psi with a 125 psi operable charged pressure, to pneumatic components disposed in the circuits. Circuits 101, 102, 103, 104 and 105 are at atmospheric pressure before being "charged" when the pressure in the conduits has reached the operable pressure thus placing the components in fluid communication with each other. Circuit 106 is an electronic communication network. One skilled in the art will recognize that regulatory compliance for fail-safe redundancy will require that one component may be part of one or more circuits and one circuit may overlap another. Thus, the circuits described are for the convenience of the reader rather than definitive of one or more operational conditions.

Generation circuit 101 generates compressed air and maintains the necessary operating pressure of system 100. Generation circuit 101 includes air compressor 110, compressed air control device 112, and conduits 111, 113, 115a, and 115b. Air compressor 110 is powered by the engine of the truck, interchangeably referred to as a tractor, through gears or a V-belt. Compressor 110 is a conventional air compressor appropriately sized within predetermined limits to the task of supplying compressed air for brake system 100. When air compressor 110 is loaded, i.e. engaged, it passes compressed air to compressed air control device 112 via conduit 111. To unload, i.e. disengage air compressor 110, compressed air control device 112 sends a pneumatic sense signal through conduit 113 to air compressor. Upon receipt of the sense signal to unload, air compressor 110 ceases to deliver compressed air. Conversely, compressed air control device 112 may also send a pneumatic sense signal to air compressor 110 to load the system, as after a prolonged period of inactivity by air compressor 110.

Compressed air control device 112 may be a unit made according to the teaching of U.S. Pat. No. 6,041,808 issued to Blanz or U.S. Pat. No. 5,678,900 issued to Blanz, the disclosures of which are hereby incorporated by reference, and assigned to the assignee of this application. Compressed air control device 112 may also be of a different design that provides substantially the same functions as that described in the embodiment.

FIG. 4 is a cross-section of the compressed air control device 112 in accordance with one embodiment of the invention. Compressed air control device 112 receives compressed air from air compressor 110 (shown as schematic DIN symbol). Compressed air control device 112 includes unloader 203; control units 204, 205, 206, 207, and 208 disposed with integral pressure protection valves for maintaining pressure within brake system 100. Preferably, control units 204, 205, 206, 207, and 208 correspond to control units 4, 5, 6, 7, and 8 of the disclosure of U.S. Pat. No. 6,041,808, respectively.

However, control units 204, 205, 206, 207, and 208 may be any other type of control unit capable of performing any or the functions of the invention.

Further, control units 204, 205, 206, and 207 include sensor 204a, 205a, 206a, or 207a; passageway 204b, 205b, 206b, or 207b; actuation means 204c, 205c, 206c, or 207c; and exhaust port 204d, 205d, 206d or 207d, respectively. Sensors 204a, 205a, 206a, and 207a may be any type of sensor that is capable of determining fluid pressure and interfacing with electronic control unit 210. Passageways 204b, 205b, 206b, and 207b transmit a pneumatic sense from respective exhaust port 204d, 205d, 206d or 207d to respective sensor 204a, 205a, 206a, or 207a. Exhaust port 204d, 205d, 206d or 207d may be any kind of port where a conduit carrying the required pneumatic pressures of a brake system may be operably connected.

Preferably, sensor 204a, 205a, 206a, and 207a; passageway 204b, 205b, 206b, and 207b; actuation means 204c, 205c, 206c, and 207c; and exhaust ports 204d, 205d, 206d and 207d correspond to pressure sensor 59, line 57; actuation means 50 and solenoid valve 53 et al.; and port of check valve 46 of the disclosure of U.S. Pat. No. 6,041,808, respectively.

Preferably, actuation means 204c, 205c, 206c, and 207c are solenoid valves in the normally closed position. Preferably, actuation means 204c and 205c, or other actuation means controlling primary and secondary supply circuit 102 and 103, respectively, are set to a minimum 75 psi setting to ensure a minimal pressure in the supply circuit. If the minimum pressure is determined by electronic control unit 210 during operation of the vehicle, the electronic control unit 210 sends a pneumatic sense signal to air compressor 110 to load the system.

Control units 204, 205, 206, and 207 are connected to at least one of pneumatic circuits 102, 103, 104 and 105, and preferably are connected in that respective order. Any order of connection may be used to accommodate the necessary routing. However, for the sake of clarity the above order is used in this description. Thus, control unit 204 is connected by conduit 115a with primary supply reservoir 116a and control unit 205 is connected by conduit 115b to secondary supply reservoir 116b.

Compressed air control device 112 further includes electronic control unit 210 for controlling the circuits and receiving instruction from a dash mounted control unit and connected via electrical conduit 212 to an electric power source such as the vehicle battery; air dryer 214 for drying compressed air; unloader 203 for engaging and disengaging compressor 112; muffler 216 for exhausting compressed air; and integral regeneration line 218 for regenerating air dryer 214.

Primary supply circuit 102 includes primary supply reservoir 116a; drain valve 117a; foot brake valve 118; hand valve 124; relay valve 120; service brakes 182a and 182b; and a plurality of conduits and valves. Reservoirs 116a holds compressed air for selective release. It is sized to meet regulatory requirements and/or engineering design criteria including the condition that in the absence of a functioning air compressor sufficient stored compressed air is available that the brakes may be applied several times. To protect reservoir 116a from overpressurization, control unit 204 of compressed air control device 112 includes a pressure protection valve.

Secondary supply circuit 103 includes secondary supply reservoir 116b; drain valve 117b; foot brake valve 118; release valve 122; service brakes 180a and 180b; and a plurality of conduits and valves. Reservoir 116b holds compressed air for selective release. It is sized to meet regulatory requirements and/or engineering design criteria including the condition that in the absence of a functioning air compressor the brakes may be applied several times. To protect reservoir 116b from overpressurization, control unit 205 of compressed air control device 112 includes a pressure protection valve.

Since compressed air, even after it has been passed through an air dryer still retains some moisture and oil from the compressor, drain valves 117a and 117b are provided to remove this condensate moisture and oil. When the reservoirs 116a and 116b are pressurized to a predetermined level, control unit 205, 206, 207, and 208 in compressed air control device 112 send a disengaging signal to the compressor 110 and any excess pressure is vented through muffler-unloader 216 associated with compressed air control device 112.

Foot brake valve 118 is associated with the brake pedal of the vehicle. When foot brake 118 is actuated by the driver, compressed air is fed from reservoirs 116a and 116b to the actuating chambers of the truck service brakes 180a, 180b, 182a, and 182b via a plurality of conduits and valves. Foot brake valve 118 is any kind of valve that gives the operator control to apply the brakes.

In primary supply circuit 102, conduit 140 connects reservoir 116a to an entrance port of check valve 130. Conduit 141 connects an exhaust port of check valve 130 to one port of release valve 120. An exhaust port of check valve 130 is connected to a port of check valve 131 via conduit 142. Conduit 143 connects one port of check valve 131 to an entrance port of foot brake valve 118.

Preferably, foot brake valve 118 is a dual circuit type valve responsive to a treadle and plunger or pedal and plunger operated by the driver. Therein, a passageway in foot brake valve 118 connects conduit 143 to an exit port which conduit 144 connects to a port of check valve 132 and also another passageway connects that same entrance port to an exit port which conduit 149 connects to a port of check valve 133. During normal operation, when foot brake valve 118 is actuated, air is fed from reservoir 116a to conduits 144 and 149.

In secondary supply circuit 103, conduit 148 connects reservoir 116b to an entrance port of foot brake valve 118. In the event that a failure in primary reservoir 116a or the supply lines from reservoir 116a occurs, the mechanical action of depressing foot brake valve 118 causes internal valves to feed compressed air from secondary supply reservoir 116b to conduits 144 and 149 instead from primary supply reservoir 116a.

Ports of check valve 132 are connected via conduit 145 to a port of check valve 135 and via conduit 156 to a port of check valve 136, respectively. Conduit 146 connects a port of check valve 135 to a port of release valve 120 and conduit 147 connect a port of check valve 135 to a port of release valve 126. Conduits 156a and 156b connect release valve 120 to service brakes 182a and 182b, here shown in accordance with one embodiment disposed with spring brakes 184a and 184b, respectively.

One port of check valve 136 connects to a port of hand valve 124 which as will be described, can selectively initiate braking torque in trailer service brakes. A second port of hand valve 124 is connected via conduit 157 to a port of check valve 131. Conduit 150 connects an exhaust port of check valve 133 to a port of relay valve 122. Conduits 151a and 151b connect ports of relay valve 122 to service brakes 180a and 180b, respectively.

One port of check valve 133 is connected to one port of check valve 134 via conduit 152. Conduit 153 connects another port of check valve 134 to a port of check valve 136. A third port of check valve 134 is connected to light switch 128 via conduit 154. Preferably, light switch 128 is an electromechanical switch responsive to compressed air being fed causes the stop lights of the vehicle to become lit indicating a stop to other vehicles.

Conduit 155 connect light switch 128 to one entrance port of two way protection valve 138. A passageway in protection valve 138 connects the entrance port to an exhaust port where conduit where conduit 158 connect the exhaust port to the gladhand connector 160a. Gladhand connector 160a of the tractor mates operably with gladhand connector 161a of the trailer.

In the trailer, conduit 163a connects gladhand 161a to one port of release valve 162. Another port of release valve 162 is connected to reservoir 164. One port of release valve 162 is connected via conduit 165a to service brake 186a and another port is connected via conduit 165b to service brake 186b. One port of release valve 162 is connected via conduit 166a to service brake 188a and a further port is connected via conduit 166b to service brake 188b. Service brakes 186a, 186b, 188a, and 188b are shown in accordance with one embodiment disposed with spring brakes 187a, 187b, 189a, and 189b, respectively.

Upon application of foot brake 118, primary supply circuit 102 and secondary supply circuit 103 are selectively engaged to supply compressed air to the service brakes. Therein, during normal operations reservoir 116a, and during failure in reservoir 116a, reservoir 116b are placed in fluid communication with service brakes 182a and 182b as compressed air is selectively fed through a passageway in the foot brake valve 118 and proceeds via conduits 144, 145, and 146 to release valve 120. Release valve 120 then feeds compressed air to the actuation chamber to service brakes 182a and 182b via connecting conduits 156a and 156b, respectively.

The amount of force acting on the actuating chambers of service brakes 182a and 182b is relative to the amount of force applied to foot brake valve 118. The harder the brake pedal is applied by the operator-driver, the more compressed air rushes through the system to the service brakes. Once the brake pedal is released, compressed air is exhausted to the ambient air through release valve 120 which is placed in the service brake line to accelerate the release or pressurized air in the conduit to disengage the braking torque of brakes 182a and 182b.

Similarly, upon application of foot brake 118, during normal operations reservoir 116a, and during failure in reservoir 116a, reservoir 116b are placed in fluid communication with service brakes 180a and 182b as compressed air is selectively fed through a passageway in foot brake valve 118 and proceeds via conduits 149 and 150 to release valve 122 which then feeds compressed air to service brakes 180a and 180b via connecting conduits 151 and 151b, respectively.

Tractor parking/emergency supply circuit 104 includes spring brakes 184a and 184b; conduits 170, 171a, 171b; and multi-port valve 126. Conduit 170 connects a port of compressed air control device 112, preferably port 206d, to one port of multiport valve 126. The charging of circuit 104 will be described in combination with the operation of controller area network 106.

The application of foot brake valve 118 further places reservoirs 116a and 116b in fluid communication with trailer service brakes 186a, 186b, 188a, and 188b as compressed air is selectively fed through a passageway in foot brake valve 118 and proceeds via conduits 149, 152, 154 and 158 and a plurality of conduits to gladhand connector 160a. There, the gladhand connector 161a operably mates with connector 160a. Compressed air is fed through the connectors from the tractor to the trailer. As the system is first placed in service, release valve 162 directs that reservoir 164 is filled to a predetermined pressure with compressed air. Braking torque is achieved when compressed air is fed from valve 162 to service brakes 186a, 186b, 188a, and 188b through connecting conduits.

Reservoir 116a can also be placed in fluid communication with trailer service brakes 186a, 186b, 188a, and 188b when hand valve 124 is selectively engaged by the operator-driver. Compressed air is fed from conduit 157 charged with compressed air from reservoir 116a to a port of hand valve 124, through a passageway, and to another port that is connected to conduit 153 which connects to check valve 134. Check valve 134 prevents compressed air from back-flowing into conduit 152 and unintentionally engaging tractor service brake 180a and 180b.

Trailer parking/emergency supply circuit 105 includes conduits 167, 168, 169, 172, 173, and 174; spring brakes 187a, 187b, 189a, and 189b; and a plurality of valves. Conduit 172 connects a port of compressed air control device 112, preferably port 207d to two way protection valve 138 which in turn feeds compressed air to gladhand connector 160b via conduit 173. Connector 160b mates with gladhand connector 161b.

In the trailer, conduit 163b connects gladhand 161b to one port of release valve 162. In the trailer, conduit 163a connects gladhand 161a to one port of release valve 162. Another port of release valve 162 is connected to reservoir 164. One port of release valve 162 is connected via conduit 169 to spring brake 187a and is further connected via conduit 174 to spring brake 187b. One port of release valve 162 is connected via conduit 167 to spring brake 189b and is further connected via conduit 168 to spring brake 189a, spring brakes 187a, 187b, 189a, and 189b are shown in accordance with one embodiment disposed with service brakes 186a, 186b, 188a, and 188b; respectively.

Trailer parking/emergency supply circuit 105 is selectively engaged by the operator-driver through the dash control assembly 250, described in connection with circuit 106, to supply compressed air to trailer spring brakes 187a, 187b, 189a, and 189b to overcome the biasing. Therein, during normal operations compressed air control device 112, and during failure in conduits leading to the trailer spring brakes reservoir 164, is placed in fluid communication spring brakes 187a, 187b, 189a, and 189b. Release valve 162 then feeds compressed air to spring brakes 187a, 187b, 189a, and 189b, respectively.

Controller area network 106 includes dash control assembly 250, cabling 251, and electronic control unit 210 of compressed air control device 112. Controller network area 106 may be any type of serial communication bus for real-time control applications conforming to the controller area network CAN standards, including CAN 1.2 and 2.0, developed by Robert Bosch GmbH of Stuttgart, Germany; International Standards Organization standard ISO 11898 and/or ISO 11519; CANopen; Local Interconnect Network (LIN); and/or any other protocol that labels messages by an identifier that is unique throughout the network and where each receiving node performs an acceptance test to see if the message is pertinent to that node.

In accordance with best mode embodiment, controller area network 106 is a series bus topology for data transmission from disparate nodes. In accordance with one embodiment of the invention, controller area network 106 is a star topology for data transmission from disparate nodes. In accordance with one embodiment of the invention, controller are network 106 is a ring topology for data transmission from disparate nodes. In accordance with one embodiment of the invention, controller area network 106 is any network topology for data transmission from disparate nodes.

Preferably, cabling 251 is a shielded two conductor electrical conduit leading from the first node, dash control assembly 250, to the second node, electronic control unit 210 of compressed air control device 112. Cabling 251 also may be one or more multiple conductor, unshielded, or may be a copper alloy conductor commonly used in residential telephone wiring. However, the latter two choices may yield increased electrical noise levels. Thus, preferably cabling 251 is located to maximize the signal-to-noise ratio.

Dash control assembly 250 may be any type of electronic switch assembly that has the ability to act as a node and send and receive an electronic signal in conformance with one or more of the aforementioned controller area network protocols to electronic control unit 210 of compressed air control device 112 via cabling 251 and thus be placed in communication with electronic control unit 210 of compressed air control device 112. Preferably, dash control assembly 250 is mounted in the cabin dash of the tractor. In accordance with one embodiment of the invention, distinctively different switches; for example a yellow switch, push button or knob, operatively engage and disengage the parking/emergency brake of the tractor and for example a red switch, push button or knob, operatively engage and disengage the trailer braking system.

Figure 5:
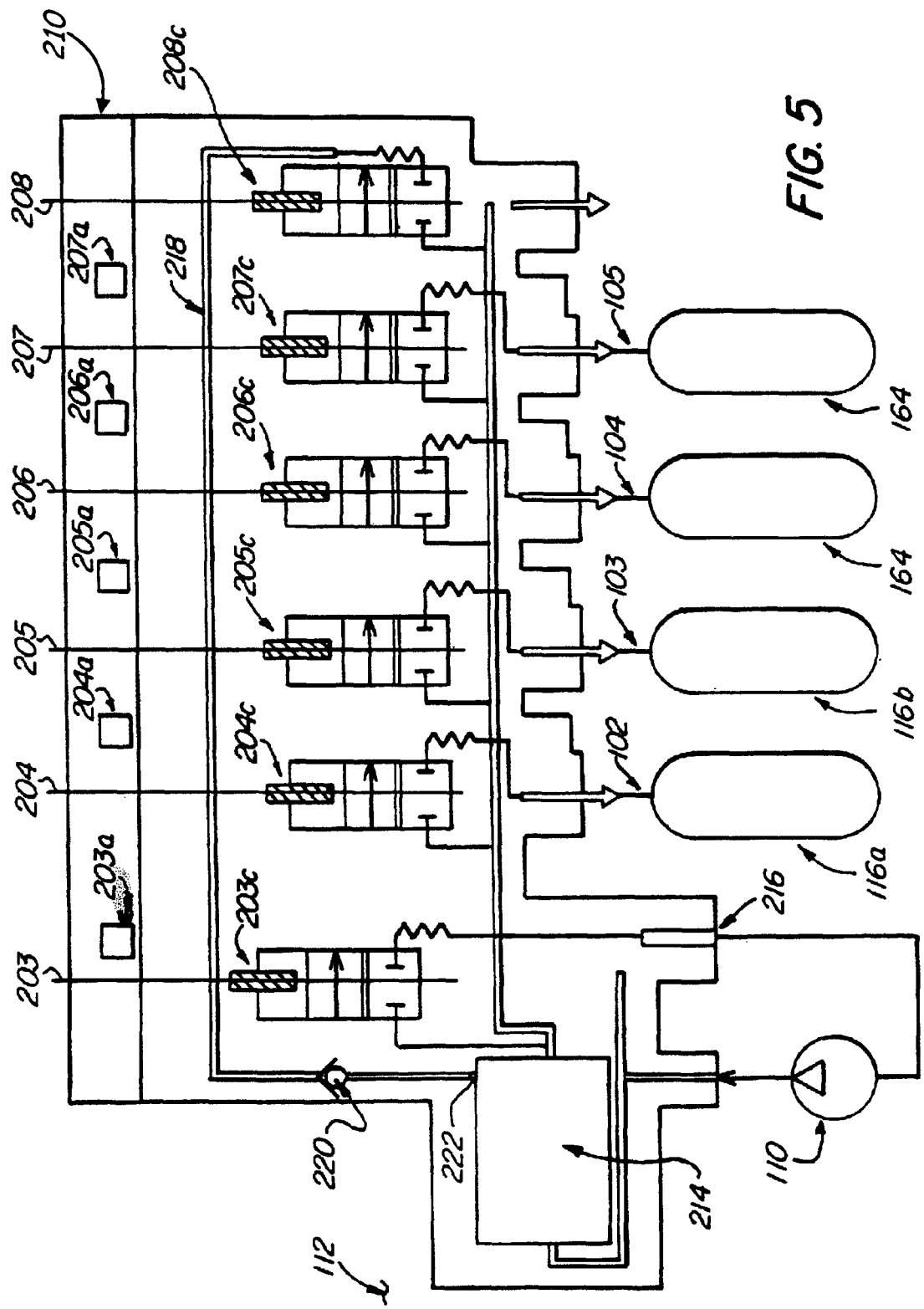
FIG. 5 is a schematic diagram of the operational flow control of the compressed air control device in accordance with one embodiment of the invention.

FIG. 5 is a schematic diagram of the operational flow control of compressed air control device 112 in accordance with one embodiment of the invention. Compressed air control device 112 manages the production of compressed air from the ambient air by compressor 110 and the selective pressurization of a circuits 101, 102, 103, 104, and 105. To illustrate the air management of compressed air control device 112, four operating conditions as applicable to the unit are described: charging of brake system 100, driving of a tractor-trailer combination having a brake system 100 installed, braking and post-braking of a tractor-trailer combination having a brake system 100 installed, and forced regeneration of compressed air of brake system 100.

To charge system 100, air compressor 110 feeds compressed air to compressed air control device 112. When the engine is started, control units 204 and 205 receive a sense signal from sensors 204a and 205a to fill primary reservoir 116a and secondary reservoir 116b, respectively, and in turn pressurizing primary supply circuit 102 and secondary supply circuit 103. In compliance, control unit 204 initiates the opening of actuation means 204c, which is normally closed (shown as a gap in the bottom one-third of ISO 1219-1 symbol) to feed compressed air to reservoir 116a (shown as a directional arrow in the center one-third of ISO 1219-1 symbol) and control unit 205 initiates opening of actuation means 205c to feed compressed air to reservoir 116b.

When circuits 102, 103 or both are pressurized to the predetermined operating pressure, pressure sensors 204a, 205a, or both receive a sense signal from lines 204b and 205b, respectively, that circuits 102, 103, or both are pressurized to the predetermined operating pressure. In response, control unit 204 and 205 disengages activation means 204c, 205c or both (returning to the normally closed position as illustrated by the gaped position in the bottom one-third thus preventing compressed air to be fed into circuits 102 and/or 103. If no other circuits are being charged, electronic control unit 210 sends a pneumatic sense signal through muffler-unloader 216 to unload air compressor 110.

To charge tractor parking/emergency supply circuit 104 and trailer parking/emergency supply circuit 105, the operator-driver, after the vehicle engine has been started, selectively initiates the charging of the desired system through dash control assembly 250 by engaging switches for each. In response, dash control assembly 250 acts as a node on the controller area network 106 and sends a message electronic control unit 210 to charge the respective circuit 104, 105 or both. When circuits 104, 105 or both are pressurized to the predetermined operating pressure, pressure sensors 206a, 207a, or both receive a sense signal from lines 206b and 207b, respectively, that circuits 104, 105 or both are pressurized to the predetermined operating pressure. In response, electronic control unit 210 disengages activation means 206c, 207c or both thus preventing compressed air to be fed into circuits 104 and/or 105. If no other circuits are being charged, electronic control unit 210 sends a pneumatic sense signal through muffler-unloader 216 to unload air compressor 110.

During driving, the spring brake actuation chambers must be pressurized in the tractor and in the trailer to overcome the biasing of the spring. Therefore, operating pressure in tractor parking/emergency supply circuit 104 and trailer parking/emergency supply circuit 105 must be maintained and additionally, operating pressure in supply circuits 102 and 103 must be maintained. To maintain pressure in the circuits during driving operation, sensors 204a, 205a, 206a, and 207a upon receiving a sense signal that pressure at the measuring location is below operating pressure from respective lines 204b, 205b, 206b, or 207b cause respective control unit 204, 205, 206, or 207 to engage compressor 110 and feed compressed air by respective activation means 204c, 205c, 206c, or 207c to circuits 102, 103, 104, or 105.

During braking, foot brake valve 118 feeds compressed air from the supply circuits to the actuating chambers of the spring brake hereby reducing the volume of compressed air in the reservoirs and decreasing pressure in the applicable supply circuit. Post braking, compressed air exhausts from quick release valves in fluid communication with the actuating chambers of the service brakes. Thus, sensors 204a, 205a, 206a, and 207a upon receiving a sense signal that pressure at the measuring location is below operating pressure from respective lines 204b, 205b, 206b, or 207b cause respective control units 204, 205, 206, or 207 to engage compressor 110 and feed compressed air by respective activation means 204c, 205c, 206c, or 207c to circuits 102, 103, 104, or 105.

Commercial vehicles that make repeated stops in a short time span, such as buses, postal vehicles, or delivery vehicles, require forced regeneration of the desiccant bed of air dryer 214. In accordance with one embodiment of the invention, forced regeneration is accomplished according to the disclosure in U.S. Pat. No. 6,041,808 issued to Blanz.

Preferably, electronic control unit 210 has been programmed upper and a lower predetermined pressure, operably determined by a sensor at a location substantially close to the exhaust of the air dryer. Thus with respect to FIG. 4, sensor 203a and passageway 203b may be a sensor corresponding to pressure sensor 21 and passageway leading to sensor 21 in the disclosure in U.S. Pat. No. 6,041,808 issued to Blanz. However, sensor 203a may any type of sensor that is capable of determining fluid pressure and interfacing with control unit 210.

Sensor 203a receives a sense signal from passageway 203b. Upon receipt of a sense signal, electronic control unit 210 passes a signal to actuation means 208c to feed compressed air into line 218. In response, electro-mechanical unloader 203 described in the disclosure in U.S. Pat. No. 6,041,808 issued to Blanz is locked and compressed air feeds in line 218 past check valve 220 and throttle 222 and regenerates the desiccant bed of air dryer 214.

In one embodiment, brake system 100 further includes an antilock braking system subsystem 252. The antilock braking subsystem 252 improves the stopping ability of vehicles by reducing the chance of a wheel lock-up.

The antilock braking subsystem 252 includes wheel brake sensors that use electro-magnetic sensing or any other method of sensing the rotation of the wheel. The wheel brake sensors are nodes on controller area network 106 and transmit data messages relating wheel rotation. Electronic control unit 210 determines the messages are pertinent and according to predetermined methods determines the likelihood of locking-up a wheel by comparing the wheel speed to a reference speed. Electronic control unit 210 then determines the modulation to be applied to the service brakes and regulates the pressure in the brake by sending a data message to a modulating valve disposed on controller area network 106 as a node and individually associated with each brake.

In one embodiment, brake system 100 further includes a traction control subsystem 253. The traction control subsystem 253 minimizes the spinning of one or more wheels on the drive axle of a vehicle by varying braking pressure on drive axle wheels and varying vehicle engine output.

The traction control subsystem 253 includes a plurality of modulating valves individually associated with each wheel for selectively varying pressure on the drive axle wheel brakes and each valve disposed as node on controller area network 106. In response to wheel speed sensor data transmitted over controller area network 106, electronic control unit 210 sends data messages to modulate the braking pressure on each drive axle wheel to the modulating valves. The traction control subsystem 253 further includes an engine controller disposed as a node on controller area network 106 and associated with the engine for selectively varying the engine output in response to data messages from electronic control unit 210.

In accordance with one embodiment of the invention, brake system 100 further includes a pneumatic suspension subsystem 254. In trucks and tractor-trailer combinations, the pneumatic suspension systems 254 aids in controlling the load stability during braking by adjusting the suspension to prevent the load from shifting. In buses and mass transit vehicles, the pneumatic suspension subsystem 254 aids in passenger comfort by adjusting the suspension to prevent shifting of the passenger platform and/or vehicle relative to gravitational forces. Further, the pneumatic suspension system 254 allows the operator-driver to variably lower the vehicle to the ground at one or more entrances to permit easier passenger embarkation or discharge.

The pneumatic suspension subsystem 254 includes at least one subsystem sensor to determine height and/or angle of a reference point on the vehicle and disposed as a node on controller area network 106, a plurality of modulating valves for selectively varying pressure on a pneumatic suspension member and disposed as a node on controller area network 106, and a plurality of pneumatic suspension members. In response to subsystem sensor measuring data transmitted over controller area network 106, electronic control unit 210 sends data messages to modulate the suspension system during vehicle driving by Increasing or decreasing the pneumatic pressure in the suspension member to stabilize the load. In response, to a driver-operator initiating a request to lower the vehicle, for example kneel a bus, by activating a controller disposed as a node on controller area network 106, electronic control unit 210 lowers the vehicle by selectively varying the pneumatic pressure in the pneumatic suspension members. on each drive axle wheel to the modulating valves. The traction control subsystem 253 further includes an engine controller disposed as a node on controller area network 106 and associated with the engine for selectively varying the engine output in response to data messages from electronic control unit 210.

In accordance with one embodiment of the invention, brake system 100 further includes a pneumatic suspension subsystem 254. In trucks and tractor-trailer combinations, the pneumatic suspension systems 254 aids in controlling the load stability during braking by adjusting the suspension to prevent the load from shifting. In buses and mass transit vehicles, the pneumatic suspension subsystem 254 aids in passenger comfort by adjusting the suspension to prevent shifting of the passenger platform and/or vehicle relative to gravitational forces. Further, the pneumatic suspension system 254 allows the operator-driver to variably lower the vehicle to the ground at one or more entrances to permit easier passenger embarkation or discharge.

The pneumatic suspension subsystem 254 includes at least one subsystem sensor to determine height and/or angle of a reference point on the vehicle and disposed as a node on controller area network 106, a plurality of modulating valves for selectively varying pressure on a pneumatic suspension member and disposed as a node on controller area network 106, and a plurality of pneumatic suspension members. In response to subsystem sensor measuring data transmitted over controller area network 106, electronic control unit 210 sends data messages to modulate the suspension system during vehicle driving by Increasing or decreasing the pneumatic pressure in the suspension member to stabilize the load. In response, to a driver-operator initiating a request to lower the vehicle, for example kneel a bus, by activating a controller disposed as a node on controller area network 106, electronic control unit 210 lowers the vehicle by selectively varying the pneumatic pressure in the pneumatic suspension members.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An electronic control system for a motor vehicle brake system comprising a charge system, a primary supply circuit, a secondary supply circuit, a tractor parking/emergency supply circuit and a trailer parking/emergency supply circuit, the electronic control system comprising:

a housing having an input port in communication with the charge system, a first exhaust port in communication with the primary supply circuit, a second exhaust port in communication with the secondary supply circuit, a third exhaust port in communication with the tractor parking/emergency supply circuit and a fourth exhaust port in communication with the trailer parking/emergency supply circuit;

a first solenoid disposed within said housing, said first solenoid selectively allowing communication between the charge system and the primary supply circuit via the input port and the first exhaust port in response to first electrical signals;

a second solenoid disposed within said housing, said second solenoid selectively allowing communication between the charge system and the secondary supply circuit via the input port and the second exhaust port in response to second electrical signals;

a third solenoid disposed within said housing, said third solenoid selectively allowing communication between the charge system and the tractor parking/emergency supply circuit via the input port and the third exhaust port in response to third electrical signals;

a fourth solenoid disposed within said housing, said fourth solenoid selectively allowing communication between the charge system and the trailer parking/emergency supply circuit via the input port and the fourth exhaust port in response to fourth electrical signals;

an electronic control unit in communication with said first solenoid, said second solenoid, said third solenoid and said fourth solenoid;

a dash control assembly disposed on a dash of the motor vehicle, said dash control assembly in electrical communication with said electronic control unit via electrical cabling; and wherein electrical control signals are generated by said dash control assembly in response to an operator's manipulation of said dash control assembly, are communicated to said electronic control unit via the electrical cabling, and are used by the electronic control unit to generate the third electrical signals and the fourth electrical signals to control operation of said third solenoid and said fourth solenoid.

2. The electronic control system of claim 1 further comprising a first sensor operably connected for communicating a fluid pressure reading of the primary supply circuit to said electronic control unit.

3. The electronic control system of claim 2 wherein said electronic control unit utilizes the fluid pressure reading received from the first sensor to generate the first control signals to control operation of said first solenoid.

4. The electronic control system of claim 1 further comprising a second sensor operably connected for communicating a fluid pressure reading of the secondary supply circuit to said electronic control unit.

5. The electronic control system of claim 4 wherein said electronic control unit utilizes the fluid pressure reading received from the second sensor to generate the second electrical signals to control operation of said second solenoid.

6. The electronic control system of claim 1 wherein said electronic control unit attaches a unique identifier to each of the first electrical signals, the second electrical signals, the third electrical signals and the fourth electrical signals communicated to said first solenoid, said second solenoid, said third solenoid and said fourth solenoid, the unique identifier controlling a destination of each electrical signal.

7. The electronic control system of claim 1 wherein the primary supply circuit supplies pneumatic power to at least one of the following: a service brake, a spring brake, a trailer supply, an anti-lock braking subsystem, a traction control subsystem and a fluid suspension subsystem.

8. The electronic control system of claim 1 further comprising a foot brake control disposed within said primary supply circuit for controlling actuation of at least one service brake.

9. The electronic control system of claim 8 further comprising a foot brake control disposed within said secondary supply circuit for controlling actuation of at least one service brake.

10. The electronic control system of claim 9 wherein the foot brake control disposed within said primary supply circuit and the foot brake control disposed within said secondary supply circuit comprise the same foot brake control.

* * * * *